9446X
H. Andrews,
Making Barrel Heads,
Patented Mar. 2, 1836.
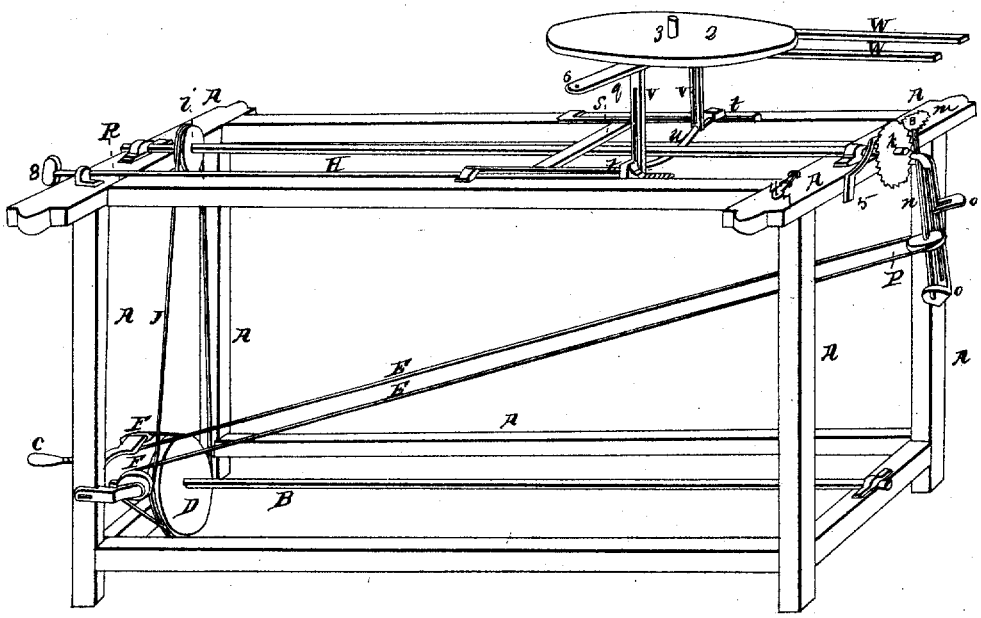
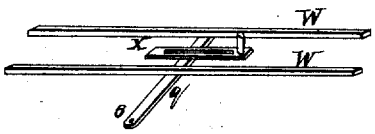
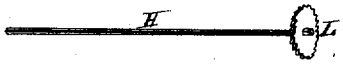
AM. PHOTO-LITHO. CO. N.Y. (OSBORNE'S PROCESS.)

3/2/1836 9446X

March 2 1836

Hiram Andrews of Canaan, County of Litchfield, Connecticut.

The schedule referred to in these Letters Patent and making part of the same containing a description in the words of the said Hiram Andrews him-
self of his improvement "in the machine for making Headings of casks Barrells &c"

To all People to whom these presents shall come. Be it known that I Hiram
Andrews of Canaan in the County of Litchfield & State of Connecticut have
invented a new and useful machine for the purpose of Cutting & forming
heads or heading for barrells & other casks & that the following is a full and
exact description thereof. First an upright frame of any convenient
size generally in the form of a parallelogram & composed of any sub-
stantial materials as iron wood or otherwise, upon the lower pieces of
the frame is placed a revolving horizontal shaft of iron wood or other
substantial material on the one end of which is affixed a crank by which
the machine may be propelled or if it is required to propel the same by
water or other power the crank or handle aforesaid may be removed and
any other proper machinery may be attached to accomplish this object.
upon one end of this shaft is affixed a whirr or drum over which revolves
a strap connected with two revolving pullies directly opposite and attach-
-ed to the opposite side of the frame by means of a shackle. On the top
of the frame & in the centre thereof is placed another horizontal shaft in
the same direction with the other & leaving on the upper parts of the frame
on the one end of this shaft is also a whirr connected by a strap with a
whirr or drum on the end of the first mentioned shaft on the other end
of this second shaft are affixed by means of a screw & nut or in any other
firm manner two circular saws with no interstice between them, the
outside saw is the largest of the two & is concave convex & saws the inside
bevel of the heading the concavity of this saw is formed by the arc of
a circle about one seventh larger than the heading required, this saw
for neath [illegible] cut heading seventeen inches in diameter will vary so as to cut them one inch or more larger or smaller and when heading of dif-
ferent dimensions are required this saw must be taken from the shaft
and another substituted the concavity of which leaves the same proportion
to the heading required & will vary in the proportion alone - the smaller
& inside of these two saws need not to removed when heading of various
dimensions are required but it will effect its purpose on heading
of any description & this is to cut the edge of the head so that it will
fit properly into the groove of the cask & its teeth are a little the longest
on its outer side, at the same end of the frame another saw is affixed to the
upper end of a perpendicular revolving shaft which is connected to the
frame by means of two sliding bars, by means of these bars this shaft
is moved in any direction & the saw attached to the end of it is made
to bear upon the heading so as to cut the outer bevel of the head in
any required manner, on the other end of this shaft is affixed a whurr
connected by a strapp passing diagonally to the other corners of the frame
where it passes over the pullies which revolve in in the shackle & thence
over the whurr or drum on the first mentioned horizontal shaft at the
bottom of the frame, Parallel with the horizontal shaft on the top
of the frame is affixed a carriage which slides from one end of the frame
to the other and is moved by means of a horizontal screw which is placed
under said shaft or in any other convenient place and passing through a
box screw affixed to the carriage, this motion of the carriage is to adapt
heading of different dimensions to the machine.

To a curved axle the ends of which pass through upright
boxes affixed to each side of the carriage is affixed two upright sliding
bars one at each end of the axle & inside the upright boxes & are made
fast to the axle by screw bolts, this axle passes directly across & under
the uppermost horizontal shaft & by means of the horizontal screw [illegible]
be removed from the saw a distance equal to half the diameter of the
circle to which the concavity of the outside saw on the horizontal shaft
is formed, the centre of the axle is on a level with the centre of the upper
horizontal shaft, from the top of each of the two upright sliding bars a

3/2/1836 9446X horizontal bar extends to the end of the frame where the saws are placed on
the top of these sliding bars, is a cross piece which connects them them together
in the centre of which is a slide & on the top is placed a circular revolving
platform the centre of which should be placed from the horizontal shaft
to which the two saws are affixed a distance equal to half the diameter of
the heading required & this platform is raised or depressed as occasion
may require by means of said upright sliding bars attached to the axle
this motion alters the bevel of the head, this circular platform moves with
the horizontal bars & in the same direction and when turned toward the
saws said bars rest on the end of the frame, the cross piece which con-
-nects the two upright sliding bars at their top, is placed in contact
with the under side of said revolving platform & directly over the
axle & in the centre of the slide which is attached to this cross piece is
a pivot passing through, and projecting above the centre of said platform
& on the same, the platform revolves, Upon the projecting end of the pivot
the material for heading is fixed. This pivot is made to slide in
any direction required & the platform by such motion is carried
to or from the saws one end of said cross bar projects beyond the side
or edge of the revolving platform & on the upper surface & near the
end of the bar is a mark and on the end of the frame next the saws
& on the same side of the frame where the bar projects is affixed a
slide on which is a similar mark the use of these two parts of the
machine is to enable the workman to regulate the machine so as
to cut heading of any required dimensions and is done in this manner,
take the admeasurement in a pair of compasses place one foot of
the compass upon one of the marks then turn the horizontal
screw until the other foot reaches the other mark. upon the end
of the frame where the saws are attached is fixed an upright bar
of iron which may be raised or depressed at pleasure & passes between
the inner saw affixed to the horizontal shaft & the circular platform upon
the upper one of which the heading rests when the machine is in operation.
Upon my invention consists in the combination of the several parts of my

3/2/1836 9446X

4214.

said machine & the placing them in the position which effect my object of cutting and forming heads for any casks & of any description.

Witnesses
Leman Church
Richard Andrews

Hiram Andrews (1455 Acres)

Patented March 2d 1836

(Drawing)